United States Patent
Nomura

[19]

[11] Patent Number: 5,828,444
[45] Date of Patent: Oct. 27, 1998

[54] VELOCITY MEASUREMENT METHOD AND VELOCITY MEASUREMENT SYSTEM USING OPTICAL FLOW, AND OPTICAL FLOW DETECTION METHOD

[75] Inventor: Masahide Nomura, Tokyo, Japan

[73] Assignee: NEC Corporation, Tokyo, Japan

[21] Appl. No.: 616,583

[22] Filed: Mar. 15, 1996

[30] Foreign Application Priority Data

Mar. 15, 1995 [JP] Japan ................................ 7-055663

[51] Int. Cl.⁶ .......................... G01P 3/36; G01N 21/00; H04N 7/18
[52] U.S. Cl. ...................... 356/28; 348/135; 356/342
[58] Field of Search ..................... 356/28, 342; 348/135

[56] References Cited

U.S. PATENT DOCUMENTS 3,890,462  6/1975  Limb et al. .
4,984,068  1/1991  Sugiyama et al. ................. 358/31
5,011,278  4/1991  Farrell ................................ 356/28
5,517,298  5/1996  Devenport ......................... 356/28
5,610,703  3/1997  Raffel et al. ....................... 356/28

FOREIGN PATENT DOCUMENTS 0 571 121 A2  11/1993  European Pat. Off. .

*Primary Examiner*—Stephen C. Buczinski
*Attorney, Agent, or Firm*—Sughrue, Mion, Zinn, Macpeak & Seas, PLLC

[57] ABSTRACT

A motion picture signal, as it is obtained from a camera, is processed by a spatiotemporal filter so that an optical flow of a concerned object is measured, and a velocity of the object is measured from the optical flow, identifying the object.

10 Claims, 8 Drawing Sheets

VELOCITY MEASUREMENT METHOD AND VELOCITY MEASUREMENT SYSTEM USING OPTICAL FLOW, AND OPTICAL FLOW DETECTION METHOD

BACKGROUND OF THE INVENTION

The present invention relates generally to a method and a system for measuring a velocity of a moving object, as it is recorded-up by a camera, and particularly, to a velocity measurement method and a velocity measurement system using an optical flow detected from a time-varying image, and an optical flow detection system.

1. Description of the Relevant Art

Conventionally, there have been known two typical methods employable for measuring a velocity of a moving object such as a vehicle travelling on a road. One method detects times at which a vehicle passes two different points, and measures an interval of time therebetween. The other method irradiates microwaves at a target and measures a Doppler shift of returned microwaves, as they are reflected, to determine a velocity.

The first conventional method assumes that a shape of the object to be measured is kept constant, a course of its movement is known in advance, and nothing else passes the two points which the object to be detected passes, and thereby resulting in a lack of flexibility in utility and making it difficult to reduce measurement errors.

The second conventional method also has as its drawback that after a plurality of objects has moved, it is impossible to determine which object had a measured velocity.

Accordingly, conventional velocity measurement methods have an inherent difficulty in identifying an object of which a velocity is determined from a result of measurement, unless a device for the measurement is bound to extremely limited conditions of use.

To measure a velocity of a target moving object, there may be detected an optical flow from a time-varying image of the object. The optical flow is an apparent motion of a brightness pattern of the object in the image. Therefore, if the object is moved by a displacement, the optical flow corresponds to the motion and represents a velocity of the object.

However, when the object rotates, some image points on the brightness pattern may have increased velocities in one direction and some other points thereon may have decreased velocities in another direction.

The present invention has been achieved with such points in mind.

SUMMARY OF THE INVENTION

It is an object of the present invention to provide a velocity measurement method and a velocity measurement system in which an optical flow is measured to determine a velocity of a moving object, permitting flexible conditions for installation of employed devices, and an optical flow detection method adaptive for such a measurement.

To achieve the object, a genus of the present invention provides a method for measuring a velocity of a concerned object, the method comprising the steps of processing a motion picture signal, as it is obtained from a camera, by a spatiotemporal filter so that an optical flow of the object is measured, and determining the velocity of the object from the optical flow, identifying the object.

According to the genus of the invention, a measured optical flow of a concerned object is employed to determine a velocity of the object, as it is identified, permitting flexible conditions for installation of employed devices.

According to a species of the genus of the invention, the measurement of the optical flow of the object includes measuring spatiotemporal energy of luminance of the motion picture signal.

According to another species of the genus of the invention, the measurement of the optical flow of the object comprises the steps of measuring spatiotemporal energy of luminance of the motion picture signal by varying an extent of a spatial portion to a plurality of stages, and determining a local optical flow distribution from a distribution of local spatiotemporal energy obtained by the measurement of the spatiotemporal energy.

Further, to achieve the object, another genus of the present invention provides a system for measuring a velocity of a concerned object, the system comprising a camera, and a measurement section for performing a spatiotemporal process of a motion picture signal obtained from the camera to measure an optical flow of the object.

According to a species of this genus of the invention, the optical flow measurement section includes a spatiotemporal measurement section of luminance of the motion picture signal.

According to another species of this genus of the invention, the optical flow measurement section comprises a plurality of measurement sections for measuring spatiotemporal energy of luminance of the motion picture signal, and an operation section for determining a local optical flow distribution from a distribution of local spatiotemporal energy obtained by the measurement of the spatiotemporal energy.

Still more, to achieve the object, another genus of the present invention provides a method for detecting an optical flow representative of a first motion vector consisting of a first velocity component of a moving object and a second velocity component of the moving object, the method comprising the steps of applying an input image of the moving object to a pair of first spatial filters to obtain a pair of first spatially processed images, the first spatial filters each respectively having a first integration kernel thereof localized on a first spatial domain and a first spatial frequency domain, the first integration kernel having a first peak in a positive region of the first spatial frequency domain, the first integration kernel being complex-conjugate to an integration kernel of the other first spatial filter, applying one of the first spatially processed images to a serial connection of first, second and third temporal attenuation filter stages to have a pair of first temporarily processed images output from the first temporal attenuation filter stage, a pair of second temporarily processed images output from the second temporal attenuation filter stage and a pair of third spatially processed images output from the third temporal attenuation filter stage, processing the first, second and third temporarily processed images to determine a third velocity component representative of the first velocity component, applying the other first spatially processed image to a serial connection of fourth, fifth and sixth temporal attenuation filter stages to have a pair of fourth temporarily processed images output from the fourth temporal attenuation filter stage, a pair of fifth temporarily processed images output from the fifth temporal attenuation filter stage and a pair of sixth spatially processed images output from the sixth temporal attenuation filter stage, and processing the fourth, fifth and sixth temporarily processed images to determine a fourth velocity component representative of the second velocity component.

According to a species of this genus of the invention, the step of processing the first, second and third temporarily processed images comprises the substeps of calculating a first difference between one of the first temporarily processed images and one of the second temporarily processed images and a second difference between the other first temporarily processed image and the other second temporarily processed image, calculating a third difference between said one of the second temporarily processed images and one of the third temporarily processed images and a fourth difference between the other second temporarily processed image and the other third temporarily processed image, calculating a first sum of the first and fourth differences and a second sum of the second and third differences, and calculating a square sum of the first and second sums.

According to another species of this genus of the invention, the method further comprises the steps of applying an image composed of a second motion vector consisting of the third velocity component and the fourth velocity component to a pair of second spatial filters to obtain a pair of second spatially processed images, the second spatial filters each respectively having a second integration kernel thereof localized on a second spatial domain and a second spatial frequency domain, the second integration kernel having a second peak different from the first peak in a positive region of the second spatial frequency domain, the second integration kernel being complex-conjugate to an integration kernel of the other second spatial filter, applying one of the second spatially processed images to a serial connection of seventh, eighth and ninth temporal attenuation filter stages to have a pair of seventh temporarily processed images output from the seventh temporal attennuation filter stage, a pair of eighth temporarily processed images output from the eighth temporal attenuation filter stage and a pair of ninth spatially processed images output from the ninth temporal attenuation filter stage, processing the seventh, eighth and ninth temporarily processed images to determine a fifth velocity component representative of the first velocity component, applying the other second spatially processed image to a serial connection of tenth, eleventh and twelfth temporal attenuation filter stages to have a pair of tenth temporarily processed images output from the tenth temporal attenuation filter stage, a pair of eleventh temporarily processed images output from the eleventh temporal attenuation filter stage and a pair of twelfth spatially processed images output from the twelfth temporal attenuation filter stage, and processing the tenth, eleventh and twelfth temporarily processed images to determine a sixth velocity component representative of the second velocity component.

According to an individual of this species of the invention, the second spatial domain is larger than the first spatial domain.

According to another individual of this species of the invention, the method further comprises a step of normaling the second motion vector before the step of applying the second motion vector to the second spatial filters.

According to another individual of this species of the invention, the step of normaling the second motion vector comprises subjecting the third and fourth velocity components to a threshold and one of a non-linear monotone increasing function and a non-linear upper-limited function.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
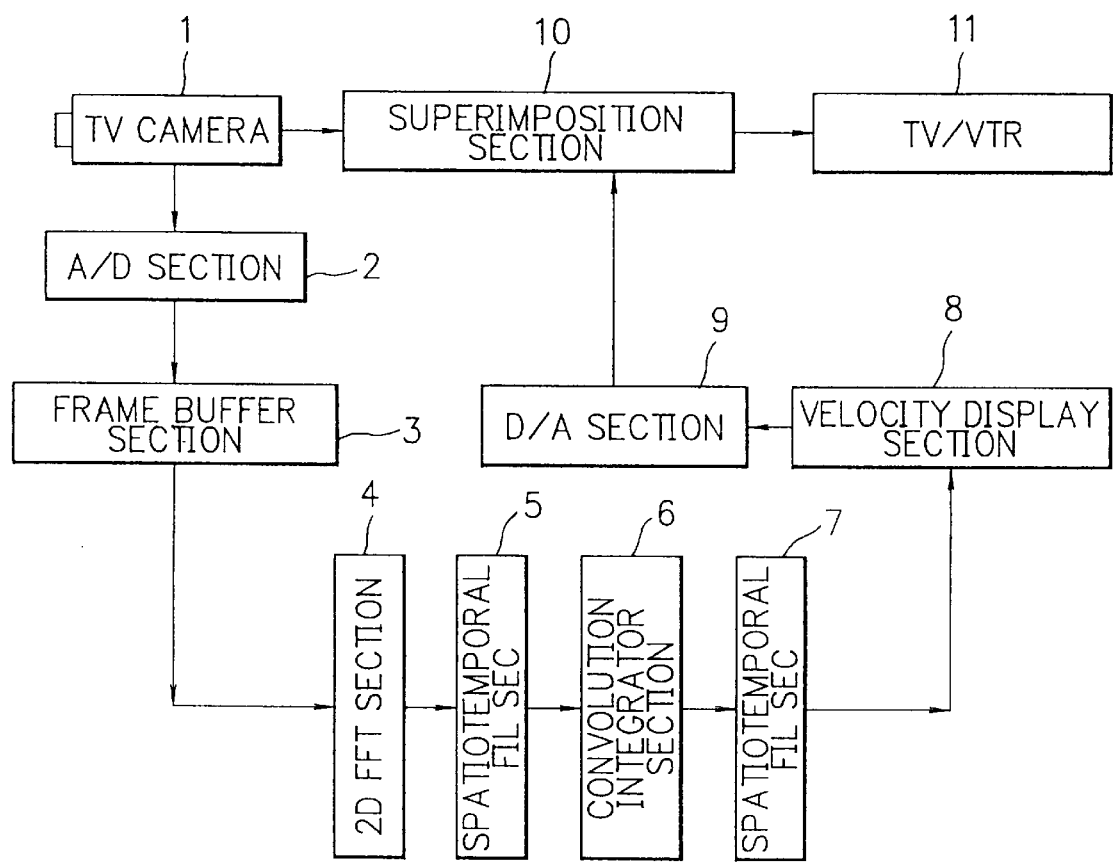
FIG. 1 is a block diagram showing a velocity measurement system according to an embodiment of the invention.

There will be detailed below preferred embodiments of the present invention, with reference to the accompanying drawings. Like members are designated by like reference characters.

A basic concept employed herein will first be described with reference to FIGS. 8 to 12.

Figure 8:
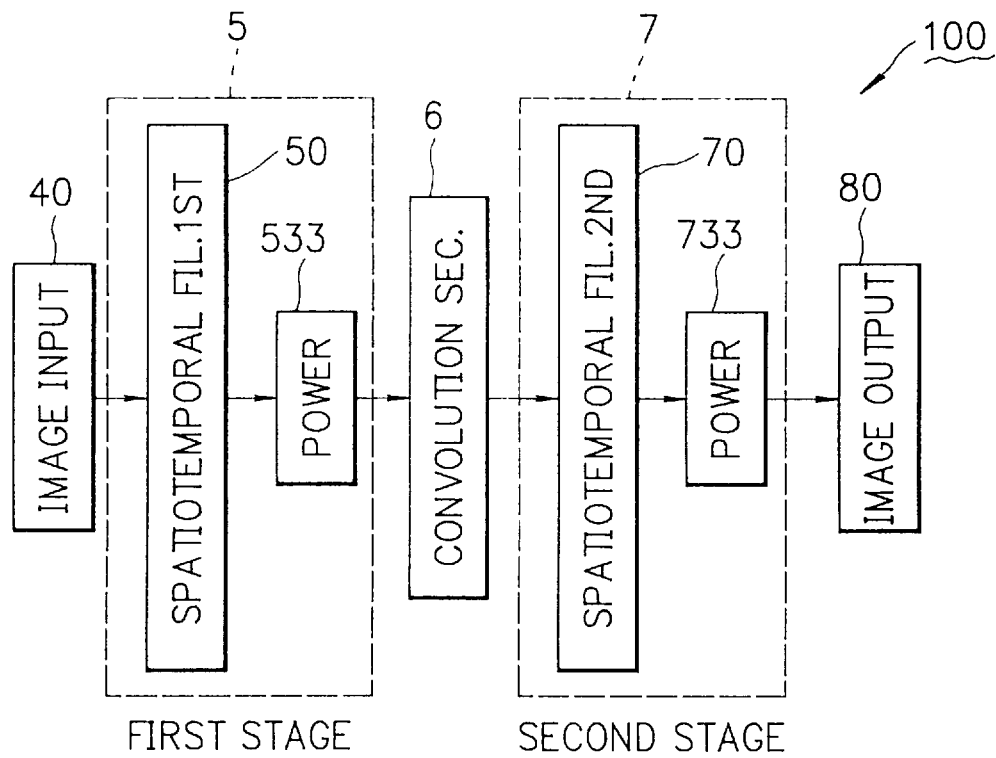
FIG. 8 is a block diagram of a conceptual image processor according to the invention.

FIG. 8 is a block diagram of a conceptual image processor according to the invention.

In FIG. 8, designated at reference character 100 is an image processor. The image processor 100 comprises an image input means 40, a first processing stage 5 composed of a first spatiotemporal filter means 50 and a first power calculation means 533, a convolution section 6, a second processing stage 7 composed of a second spatiotemporal filter means 70 and a second power calculation means 733, and an image output means 80.

The image input means 40 inputs to the first spatiotemporal filter means 50 a total set of luminance data of time-varying images including an image of a concerned moving object, as they are picked up by a camera and A/D converted.

The first processing stage 5 is adapted for a spatiotemporal filtering of the input data, in which a plurality of spatiotemporal parallel filtering processes are each executed at the first spatiotemporal filter means 50 by using an integration kernal localized on a relatively small spatial domain and a spatiotemporal frequency domain, for detecting a plurality of frequency power values each defined in terms of power in a corresponding local domain of the spatiotemporal frequency domain by operations in the first power calculation means 533.

The convolution section 6 is responsive to a set of results of the spatio temporal filtering for determining a weighted distribution of a plurality of first motion vectors each representative of a motion in a corresponding motion field, as it is picked up by the camera.

The first motion vectors have their weighted varying components in the spatiotemporal field, as a set of data to be input to the second processing stage 7.

The second processing stage 7 is adapted for a spatiotemporal filtering of input data, in which a plurality of spatiotemporal parallel filtering processes are each executed at the second spatiotemporal filter means 70 by using an integration kernal localized like that of the means 50 but defined on a spatially extended range, for detecting a plurality of frequency values each in terms of power in a corresponding local domain of the spatiotemporal frequency domain by operations in the second power calculation means 733. The second processing stage 7 is thus analogous to the first processing stage 5, except for a kernel size.

The image output means 80 is responsive to a set of results of this spatiotemporal filtering for determining a distribution of a plurality of second motion vectors each representative of a collective variation of first motion vectors in a corresponding local domain of the spatiotemporal domain.

Between the second processing stage 7 and the image output means 80, there may preferably be connected a combination of a convolution section (like 6) and a third processing stage (like 7) having integration kernels each defined on a still extended range.

Figure 9:
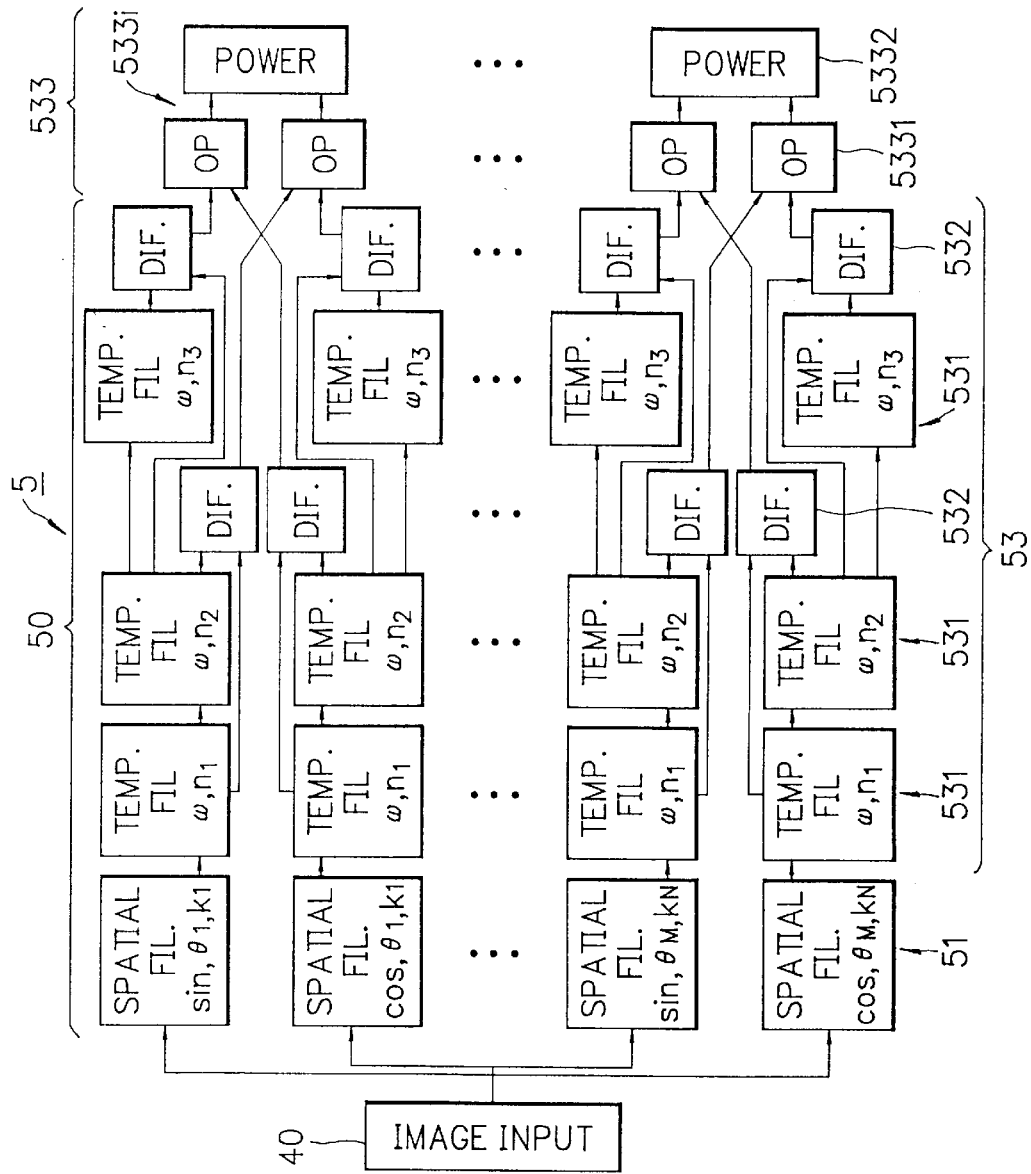
FIG. 9 is a functional block diagram of a processing stage in the processor of FIG. 8.

FIG. 9 is a functional block diagram of the first processing stage 5, which is composed the first spatiotemporal filter means 50 and the first power calculation means 533.

The spatiotemporal filter means 50 includes a total of M×N spatial filters 51, each composed of a pair of spatial component filter modules and operable for a convolution integration of input image data into a two-dimensional field, where M and N are predetermined integers such that M≧1 and N≧1, respectively.

Each spatial filter 51 may have a Fourier transform (hereafter "FFT") means (e.g. 4 of FIG. 1) provided at an input side thereof for a mapping of input data from a spatiotemporal domain to a spatiotemporal frequency domain and an inverse FFT means (e.g. 52-i of FIG. 2) provided at an output side thereof for a mapping of processed data from the spatiotemporal frequency domain to the spatiotemporal domain.

The spatiotemporal filter means 50 further includes a total of M×N temporal filter sections 53 of which a respective one is connected to a corresponding one of the spatial filters 51 and composed of a plurality (e.g. three in FIGS. 9 and 7 or four in FIG. 3) of serially connected temporal filters 531 each consisting of a pair of spatial-component-processing temporal filter modules, and a total of M×N sets of difference calculators, the M×N sets being each respectively composed of a plurality (e.g. pair in FIG. 9) of difference calculators 532 each operable for a difference calculation between neighboring two of the temporal filters 531, the difference calculators 532 being each respectively consisting of a pair of componential difference calculator modules.

The power calculation means 533 comprises a total of M×N power calculating operators 533-i of which a respective one is responsible to a set of outputs of the difference calculators 532 in an i-th one of the difference calculator sets, for calculating power of a corresponding local domain of the spatiotemporal frequency domain, where i is an arbitrary integer. Each power calculating operator 533-i is composed of a pair of componential operation modules 5331 and a power calculation module 5332.

The image input means 40 inputs a set of luminance data I(x,y;t) of a motion picture to each module of each spatial filter 51, where they are integrated by a convolution integration of which an integration kernel comprises a Gabor function $G(x,y; \kappa_j, \theta_j, \sin)$ or $G(x, y; \kappa_j, \theta_j, \cos)$ such that:

$$G(x, y; \kappa_i, \theta_j, \sin) =$$
$$(1/2\pi\sigma^2) \times \sin\{2\pi k(x\cos\theta + y\sin\theta)\} \times \exp\{-(x^2 + y^2)/2\sigma^2\}$$

or $$G(x, y; \kappa_i, \theta_j, \cos) =$$
$$(1/2\pi\sigma^2) \times \cos\{2\pi k(x\cos\theta + y\sin\theta)\} \times \exp\{-(x^2 + y^2)/2\sigma^2\},$$

where x and y are spatial coordinates, κ and θ are a magnitude and a direction of a central spatial frequency of the temporal filters 531, respectively, and k and σ are adequate constants such that 4 kσ=0.7 to 2.5.

Each temporal filter section 53 serves for a temporal filtering of a result of the convolution integration, in dependence on a response function using a time-delay function Γn(t) such that:

$$\Gamma n_1(t) - \Gamma n_1 + n_2(t),$$

where $$\Gamma n(t) = \{(\omega t)^{n-1}/(n-1)!\}\exp(-\omega t) \text{ for } t \geq 0,$$
$$= 0 \text{ for } t < 0,$$

where ω is a fundamental frequency of an integration kernel of the temporal filter section 53, and n is a number of stages of temporal filters 531.

To effect the temporal filtering at a high speed with a high accuracy, the temporal filter section 53 is composed of the plurality of serially connected temporal filters 531, which are cooperative to execute, between the result $S(x,y; \kappa_i, \theta_j, o|o=\sin \text{ or } \cos)$ of the convolution integration of the spatial filter 51 and the time-delay function Γn(t), a convolution integration H(x,y; •, •, o;t) such that:

$$H(x,y; •, •, o;t) = (S(x,y,t; •, •, •)^* \Gamma n(t),$$

for an attenuation filtering such that:

$$\rho_0(x, y; •, •, 0; t) = S(x, y; •, •, 0; t);$$

$$\rho_1(x, y; •, •, 0; t) - \rho_1(x, y; •, •, 0; t - 1) =$$
$$-\omega\{\rho_1(x, y; •, •, 0; t - 1) - \rho_{l-1}(x, y; •, •, 0; t)\};$$

$$H(x, y; •, •, 0; t) = \rho_n(x, y; •, •, 0; t),$$

where l is an arbitrary integer between 1 and n, both inclusive.

The response $\Gamma n_1(t) - \Gamma n_1 + n_2(t)$ in the temporal filter section 53 is determined by the difference calculator 532 connected between first and second temporal filters 531, of which results are processed by the power calculating operator 533-i for calculating power P(x,y, κ, θ;t) of a local spatiotemporal frequency (κ, θ) at a point (x,y,t) such that:

$$P(x, y, \kappa, \theta; t) =$$
$$[\{H_1(x, y; \kappa, \theta, \sin; t) - H_2(x, y; \kappa, \theta, \sin; t)\} -$$
$$\{H_3(x, y; \kappa, \theta, \cos; t) - H_4(x, y; \kappa, \theta, \cos; t)\}]^2 +$$

-continued $$[\{H_1(x, y; \kappa, \theta, \cos; t) - H_2(x, y; \kappa, \theta, \cos; t)\} +$$

$$\{H_3(x, y; \kappa, \theta, \sin; t) - H_4(x, y; \kappa, \theta, \sin; t)\}]^2,$$

where $H_1, H_2, H_3$ and $H_4$ are results of integrations H at modulues of the first, the second, the third and a fourth temporal filter 531, respectively.

The power $P(x,y, \kappa, \theta;t)$ represents a power level at a spatial frequency $(\kappa\cos\theta, \kappa\cos\theta)$, with respect to an image moving at a velocity $\{(\omega/k)\cos\theta, (\omega/k)\sin\theta\}$ in an input picture. Accordingly, there are provided a plurality of spatiotemporal filter sets having their central spatial frequencies $(\kappa\cos\theta, \kappa\cos\theta)$ to determine corresponding power levels $P(x,y, \kappa, \theta;t)$, for comparison therebetween to determine a velocity of a motion in the input picture.

Figure 10:
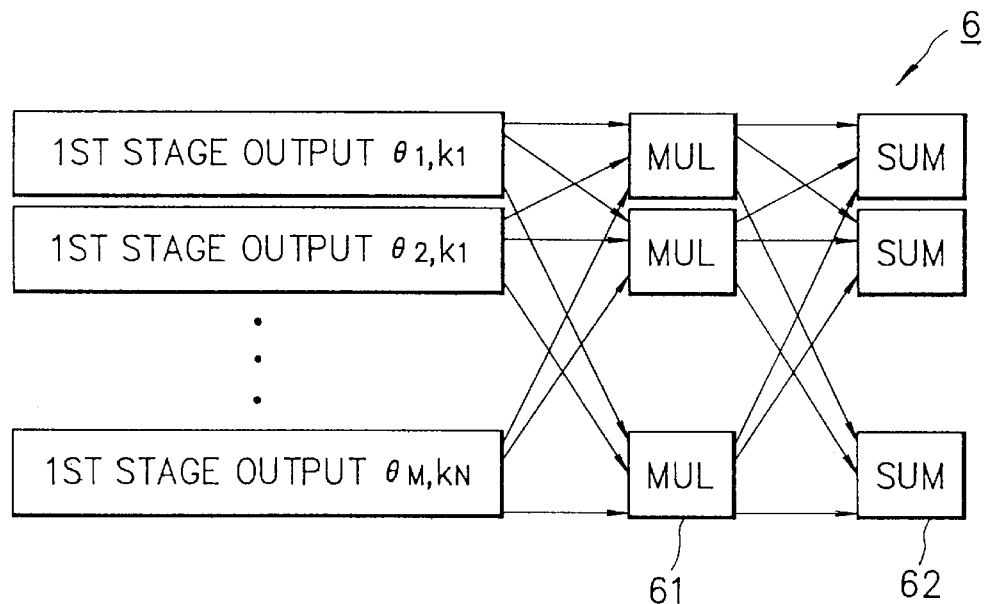
FIG. 10 is a functional block diagram of a convolution section in the processor of FIG. 8.

FIG. 10 is a block diagram of the convolution section 6.

The convolution section 6 comprises a total of M×N ×L weighting multipliers 61 and a total of M×L sum calculators 62, where L is an integer depending on a number of spatial filters of the second processing stage 7.

A total of M×N motion images, each processed with respect to a corresponding spatiotemporal frequency, are output from the first processing stage 5 to the convolution section, where they undergo a convolution operation $Q(x,y,t; \theta_0; \kappa_0)$ including a weighting $w(\theta, \kappa_2, \kappa_1)$, such that:

$$Q(x, y, t; \theta_0; \kappa_0) = \sum_j \sum_i w(\theta_0 - \theta_i, \kappa_0, \kappa_j) P(x, y, t; \theta_i, \kappa_j),$$

where the weight $w(\theta, \kappa_2, \kappa_1)$ is proportional to a second power of an integration of a distribution of integration kernels of the spatiotemporal filter sections 53 in a spatiotemporal frequency domain, with respect to an orbital plane that a pattern with a uniform spatial frequency power distribution describes in displacement at a velocity $\{(\omega/k_2)\cos\theta, (\omega/k_2)\sin\theta\}$ in the spatiotemporal frequency domain, such that:

$$W(\theta, \kappa_2, \kappa_1) \propto \left| \iiint_{\vec{\kappa}' \omega'} R_{\infty 0}(\vec{\kappa}', \omega') \delta(\vec{\kappa}'\omega - \kappa_2\omega') d\vec{\kappa}' d\omega' \right|^2;$$

$$W(\theta, \kappa_2, \kappa_1) = w(\theta, \kappa_2, \kappa_1) / \sum_{\kappa_L} \sum_\theta w(\theta, \kappa_2, \kappa_1),$$

where $\kappa'$ and $\omega'$ are integration variables.

The result $W(\theta, \kappa_2, \kappa_1)$ may be calculated by an approximation such that:

$$w(\theta, \kappa_2, \kappa_1) \propto |(1/2\pi\sigma^2) \times$$

$$\exp[-\{\omega^2(\kappa_2 - \kappa_1\cos\theta)^2\}/\{2\sigma^2(\kappa_2^2 + \omega^2)\}]|^2.$$

A plurality of data corresponding to detected levels of power in the spatiotemporal frequency domain are output from the convolution section 6 to the second processing stage 7, where they are each input to a corresponding spatial filter of which an integration kernel is localized on a larger spatial domain than the spatial domain on which the integration kernel of the first processing stage 5 is localized, so that an extended kernel size of Gabor function permits a motion vector component to be detected of a corresponding spatial region to a desired brightness pattern.

Figure 11:
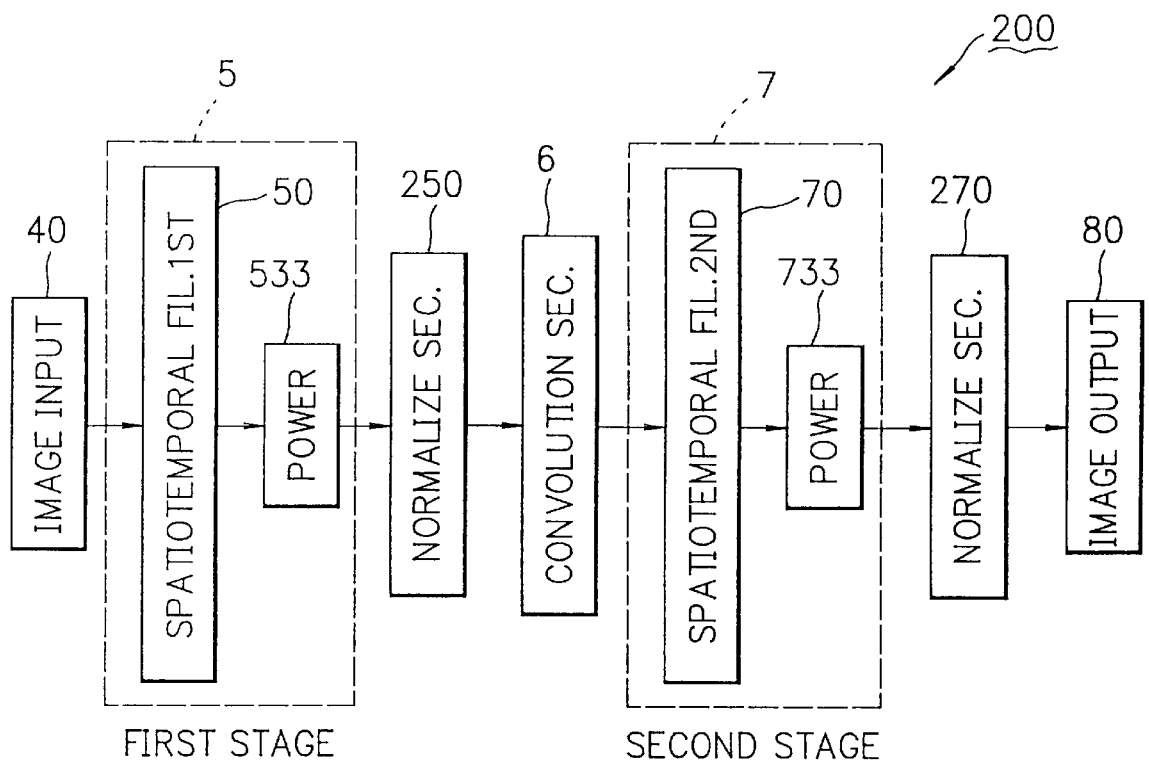
FIG. 11 is a block diagram of a modified image processor according to the invention.

FIG. 11 is a functional block diagram of an image processor 200 according to a modification of the image processor 100.

The image processor 200 is different from the processor 100 in that a normalizing section 250 is connected between a power calculation means 533 of a first stage 5 and a convolution section 6 and a normalizing section 270 analogous to the section 250 is connected between a power calculation means 733 of a second stage 5 and an image output means 80.

Figure 12:
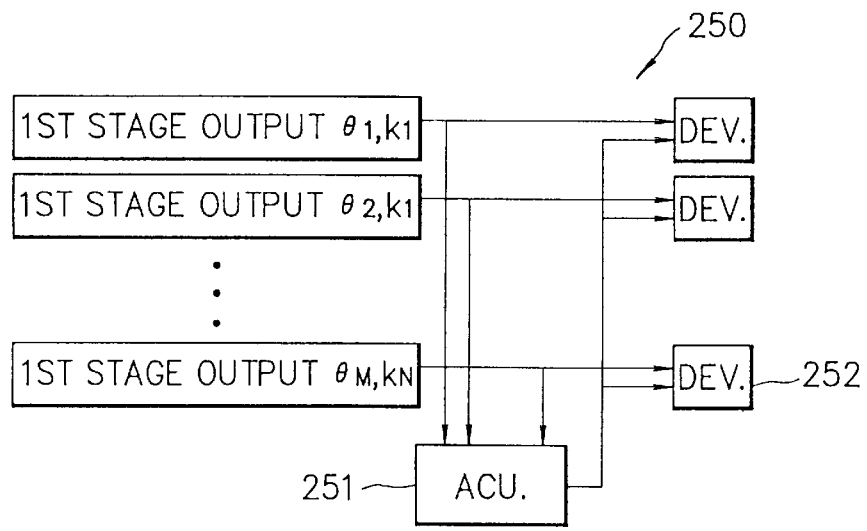
FIG. 12 is a functional block diagram of a normalizing section in the processor of FIG. 12.

FIG. 12 is a functional block diagram of the normalizing section 250.

The normalizing section 250 comprises an accumulator 251 for accummulating outputs $(\kappa_i, \theta_j)$ of the first processing stage 5, and a total of M×N dividers 252 for dividing the outputs $(\kappa_i, \theta_j)$ of the first stage 5 by an output $P(x,y,t)$ of the accumulator 252, such that:

$$\bar{P}(x, y, t) = \sum_i \sum_j P(x, y, t; \kappa_i, \theta_j),$$

$$P(x, y, t) = P(x, y, t; \kappa_i, \theta_j) / \{\bar{P}(x, y, t) + \epsilon\},$$

where $\epsilon$ is an adequate small constant.

The normalization may be such that:

$$\bar{P}(x, y, t) = F\left\{ \sum_i^m \sum_j^n P(x, y, t; \kappa_i, \theta_j), mnP_{max} \right\};$$

$$P(x, y, t; \kappa_i, \theta_j) = F\{P(x, y, t; \kappa_i, \theta_j), P_{max}\} / \{\bar{P}(x, y, t) + \epsilon\};$$

$$F(P, P_{max}) = P_{max}\tanh(P/P_{max}) \text{ for } P > 0, \text{ or for others,}$$

where $P_{max}$ is a constant proportional to a maximum value of power of input image, and m and n are numbers of magnitudes and that of directions of central spatial frequencies of spatiotemporal filters, respectively.

Such a normalization is stable even when input power P has a large variation.

For the same reason, the normalization may be such that:

$F(P, P_{max}) = P_{max} \ln\{(P/P_{max}) + 1\}$ for $P > 0$, or 0 for others.

Figure 13:
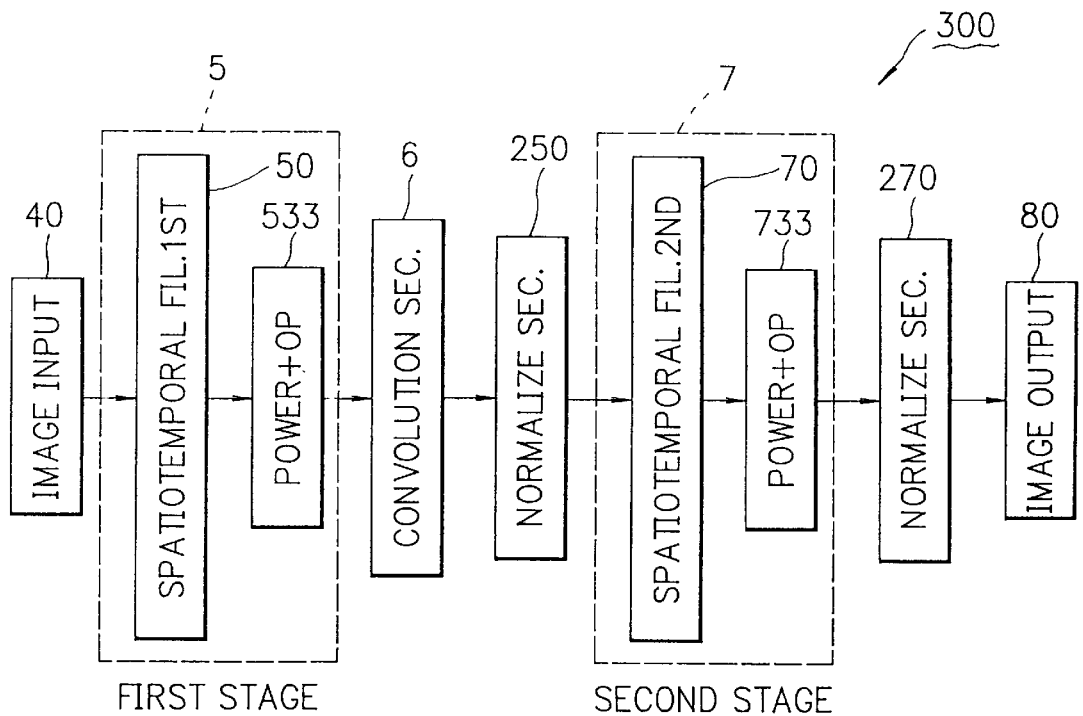
FIG. 13 is a block diagram of another modified image processor according to the invention.

FIG. 13 is a functional block diagram of an image processor 300 according to another modification of the image processor 100.

The image processor 300 is different from the processor 100 in that first and second power calculation means 533 and 733 are each adapted for a later-described non-linear power calculation and that a normalizing section 250 is connected between a convolution section 6 and a second spatiotemporal means 70 and a normalizing section 270 analogous to the section 250 is connected between the second power calculation means 733 and an image output means 80.

The non-linear power calculation is executed such that:

$$P(x, y, \kappa, \theta; t) =$$

$$[\{H_1(x, y; \kappa, \theta, \sin; t) - H_2(x, y; \kappa, \theta, \sin; t)\} -$$

$$\{H_3(x, y; \kappa, \theta, \cos; t) - H_4(x, y; \kappa, \theta, \cos; t)\}]^2 +$$

$$[\{H_1(x, y; \kappa, \theta, \cos; t) - H_2(x, y; \kappa, \theta, \cos; t)\} +$$

$$\{H_3(x, y; \kappa, \theta, \sin; t) - H_4(x, y; \kappa, \theta, \sin; t)\}]^2,$$

$$P(x, y, \kappa, \theta; t) = F[p(x, y, \kappa, \theta; t); p_0, \Theta_0];$$

$$F[x] = \ln\{(x/x_0) + 1 - \Theta_0\} \text{ for } x > x_0\Theta_0, \text{ or 0 for others,}$$

where $x_0$ is a normalization factor, and $\Theta_0$ is a threshold.

Such a calculation is stable even when power P of an input image has a large variation.

For the same reason, the non-linear power calculation may be such that:

$$P(x, y, \kappa, \theta; t) = F[p(x, y, \kappa, \theta; t); p_0, \Theta_0];$$

-continued $F[x] = \tanh\{(x/x_0) - \Theta_0\}$ for $x > x_0\Theta_0$, or 0 for others, or such that:

$P(x, y, \kappa, \theta; t) = F[p(x, y, \kappa, \theta; t); p_0, \Theta_0];$ $F[x] = \tanh\{\ln(x/x_0) + 1 - \Theta_0\}$ for $x > x_0\Theta_0$, or 0 for others.

There will be described below velocity measurement systems and velocity measurement methods according to embodiments of the present invention, with reference to FIGS. 1 to 7.

FIG. 1 is a block diagram showing an embodiment of the present invention. As shown in FIG. 1, the embodiment comprises a television camera 1 for picking up a motion picture, a frame buffer 3, a two dimentional FFT section 4, a spatiotemporal filter section 5, a convolution integrator section 6, a spatiotemporal filter section 7, an integration section, a velocity display section 8, a superimposition section 10, and a TV/VTR 11.

An operation of the embodiment will be described with reference to FIG. 1.

A picture signal output from the TV camera 1 is digitized by an A/D converter section 2, and a luminance I (x, y) at a time t is stored in the frame buffer 3. x, y are position coordinates on the picture. The luminance I (x, y) stored in the frame buffer 3 is transformed into a complex pixel data $f(k_x, k_y)$ by the 2D FFT section 4 to be transmitted to the spatiotemporal filter section 5. $k_x$, $k_y$ are local spatial frequency, which may be expressed by a vector representing a direction and a magnitude of a local optical flow. The complex pixel data $f(k_x, k_y)$ undergoes a process of a multiplicity of spatiotemporal filters with local (spatial) coverage progressively enlarged, as the stage number increases. Accordingly, a distribution $P(x, y, \kappa, \theta)$ of local spatiotemporal energy (local optical flow component) is obtained.

$P(x, y, \kappa, \theta)$ is transmitted to the convolution operator 6, and an output $Q(x, y, v, \theta)$ indicating the local optical flow distribution, which has been estimated according to the prior component analysis, is obtained to be output to the spatiotemporal filter section 7. The spatiotemporal filter section 7 calculates an optical flow distribution $R(x, y, v, \theta)$ from the local optical flow distribution $Q(x, y, v, \theta)$, and the result is output to the velocity display section 8.

The velocity display section 8 calculates a velocity distribution $\tilde{V}(x,y)$ for each pixel from the velocity distribution $R(x, y, v, \theta)$. The velocity $\tilde{V}(x,y)$ at each pixel of a picture is converted to a picture signal by the D/A converter 9 and superimposed on the original motion picture data by the superimposition section 10 to be output to a display system such as TV/VTR. Thereby, the object corresponding to the calculated velocity is identified in the motion picture.

Next, another embodiment of the present invention will be described.

Figure 2:
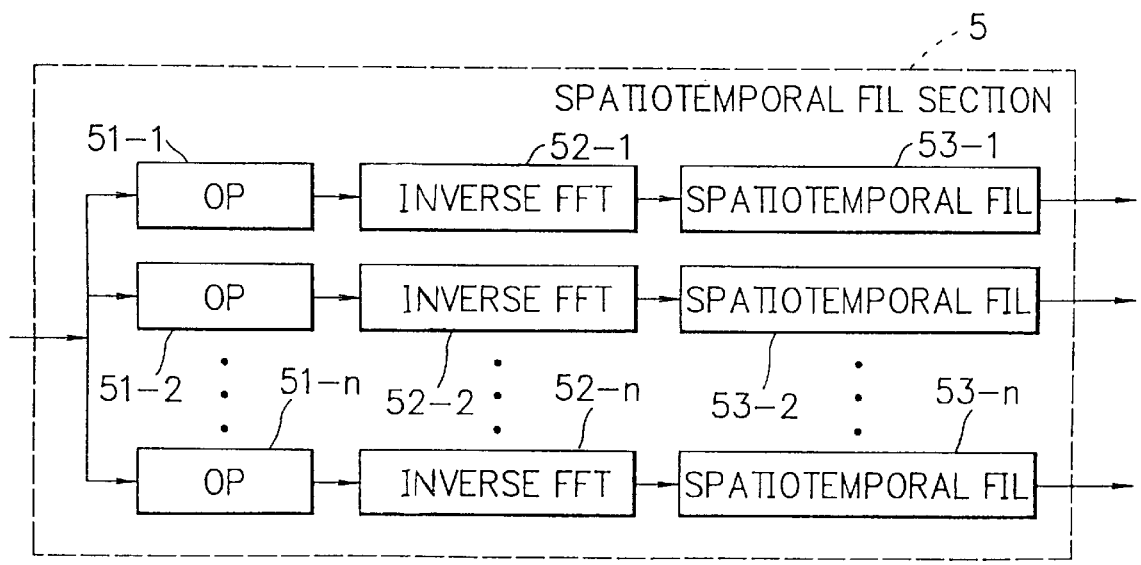
FIG. 2 is a block diagram showing a spatiotemporal filter section of the system of FIG. 1.

FIG. 2 is a block diagram showing a spatiotemporal filter section 5 according to another embodiment of the invention. As shown in FIG. 2, the spatiotemporal filter section 5 is composed of n operators 51, n inverse FFT operators 52, and n spatiotemporal filter sections 53.

An operation of the embodiment will be described with reference to FIG. 2.

An operator 51-i (i=1 to n) calculates a product $h(k_x, k_y; \kappa_i, \theta_j, S)$ of the complex pixel data $f(k_x, k_y)$ and a spatial filter kernel data $g(k_x, k_y; \kappa_i, \theta_j, S)$ (S=sin/cos), as they are Fourier transformed, such that:

$h(k_x, k_y; \kappa_i, \theta_j, )=f(k_x, k_y) \, g(k_x, k_y; \kappa_i, \theta_j, S),$ which is then transmitted to the inverse FFT operator 52-i. The inverse FFT operator 52-i (i=1 to n) executes an inverse FFT for the $h(k_x, k_y; \kappa_i, \theta_j, S)$, and outputs the result $H(x, y; \kappa_i, \theta_j, S)$ to a temporal filter section 53-i. The temporal filter section 53-i executes a temporal filtering process for the $H(x, y; \kappa_i, \theta_j, S)$, and the result $P(x, y; \kappa_i, \theta_j, S)$ is calculated. $g(k_x, k_y; \kappa_i, \theta_j, S)$ (S=sin/cos) in the case is a Gabor function applied of a Fourier transformation, such that:

$G(x,y;\kappa_i,\theta_j,\sin) = (1/2\pi\sigma^2)\sin(2\pi k(x\cos\theta + y\sin\theta)) \times$ $\exp(-(x^2 + y^2)/2\sigma^2)$ $G(x,y;\kappa_i,\theta_j,\cos) = (1/2\pi\sigma^2)\cos(2\pi k(x\cos\theta + y\sin\theta)) \times$ $\exp(-(x^2 + y^2)/2\sigma^2),$ where 4 kσ is fixed to a suitable value ranging from 0.7 to 2.5.

Figure 3:
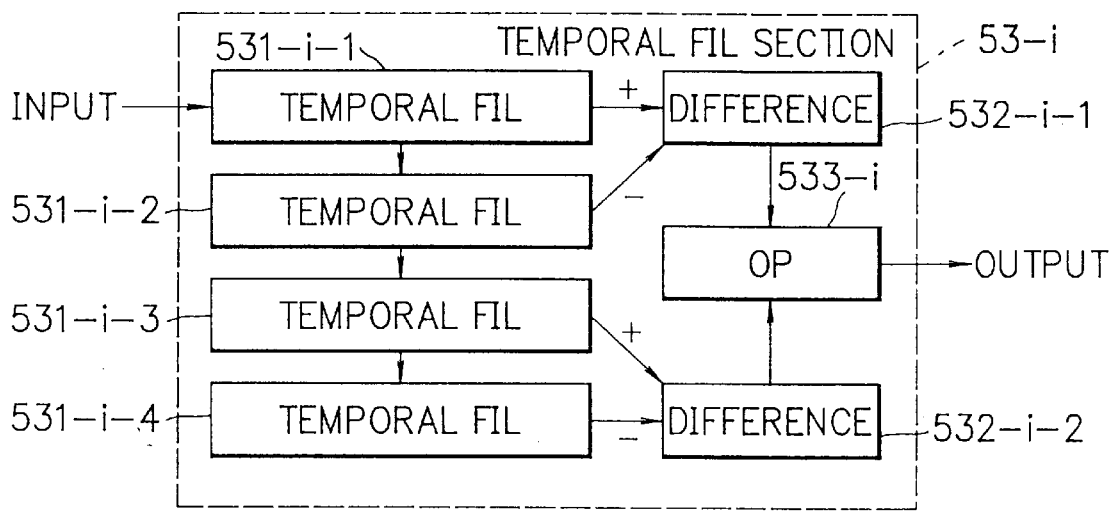
FIG. 3 is a block diagram showing a temporal filter section of the spatiotemporal filter section of FIG. 2.

FIG. 3 is a block diagram of a temporal filter section 53-i (i=1 to n) according to another embodiment of the invention. As shown in FIG. 3, the temporal filter section 53-i is composed of 4 temporal filters 531-i-j (i=1 to 4), difference calculators 532-i-1, 532-i-2, and an operator 533-i.

Next, an operation of the embodiment will be described with reference to FIG. 3.

The temporal filter 531-i-i (i=1 to 4) is a reccurrence filter of $n_j$ stages. An output $H_j$ (x, y; •, •, S;t) of a filter j at a time t is calculated according to a picture data $H_{j-1}$ (x,y; •, •, S;t) input from a filter j–1 at a time t, and an output $H_j$ (x, y; •, •S;t–1) of a filter j at a time t–1, such that:

$\rho_0(x,y;•,•,S;t) = H_j(x,y;•,•,S;t),$ $\rho_1(x,y;•,•,S;t) - \rho_1(x,y;•,•,S;t - 1) =$ $-\omega\{\rho_1(x,y;•,•,S;t - 1) - \rho_{1-1}(x,y;•,•,S;t)\},$ where $1=1-n_j$, and $H_j(x, y;•, •,S;t)=\rho_{nj}(x, y; •, •, S;t),$ where $H_0$(x, y; •, •, S;t) represents an input to the temporal filter 53-i. The result therefrom is output to the difference calculator 532-i-i or 532-i-2 to obtain a difference, which is then output to an operator 533-i for calculating a picture data $P(x, y; \kappa_i, \theta_j; t)$, such that;

$P(x,y;\kappa,\theta;t) = [\{H_1(x,y;\kappa,\theta,\sin;t) - H_2(x,y;\kappa,\theta,\sin;t)\} -$ $\{H_3(x,y;\kappa,\theta,\cos;t) - H_4(x,y;\kappa,\theta,\cos;t)\}]^2 +$ $[\{H_1(x,y;\kappa,\theta,\cos;t) - H_2(x,y;\kappa,\theta,\cos;t)\} +$ $\{H_3(x,y;\kappa,\theta,\sin;t) - H_4(x,y;\kappa,\theta,\sin;t)\}]^2,$ where $H_1$(x, y; κ, θ, sin;t) and $H_2$(x, y; κ, θ, cos;t) are sin and cos outputs of the temporal filter 531-i-1 and 531-i-2, repectively.

Figure 4:
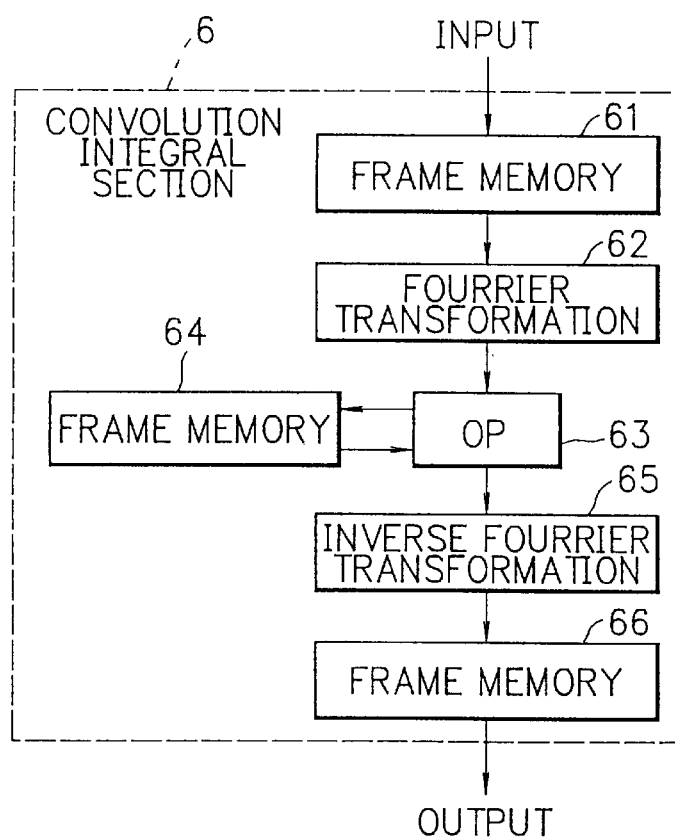
FIG. 4 is a block diagram showing a convolution integral section of the system of FIG. 1.

FIG. 4 is a block diagram showing a convolution integral section 6 according to another embodiment of the invention. As shown in FIG. 4, the convolution integral section 6 is composed of a frame memory 61, a Fourier transformation unit 62, an operator 63, a frame memory 64, an inverse Fourier transformation unit 65, and a frame memory 66.

Next, an operation of the embodiment will be described with reference to FIG. 4.

The picture data p(x, y; κ, θ) output from the temporal filter 5 is once stored in the frame memory 61 and then output to the Fourier transformation unit 62 for undergoing a four dimensional Fourier transformation to obtain data $p(k_x, k_y; K, \Theta)$. Then, using $o(k_x, k_y; K, \Theta)$ stored in the frame memory 64, the operator 63 calculates a product for each component to obtain a quantity Q(x, y, v, θ) representing a local optical flow distribution by the inverse Fourier transformation unit 65. The result therefrom is stored in the frame memory 66. With the convolution integral process as described, the quantity Q of the local optical flow distribution is calculated from the P(x, y; κ, θ) representing the local spatiotemporal energy (component of the optical flow). o($k_x$, $k_y$; K, Θ)) in the case is previously calculated, by applying a Fourier transformation to O($k_x$, $k_y$; K, θ). A convolution integral kernel O($k_x$, $k_y$; K, θ) is set appropriately such that a local optical flow distribution is obtained from a component distribution of the flow.

Figure 5:
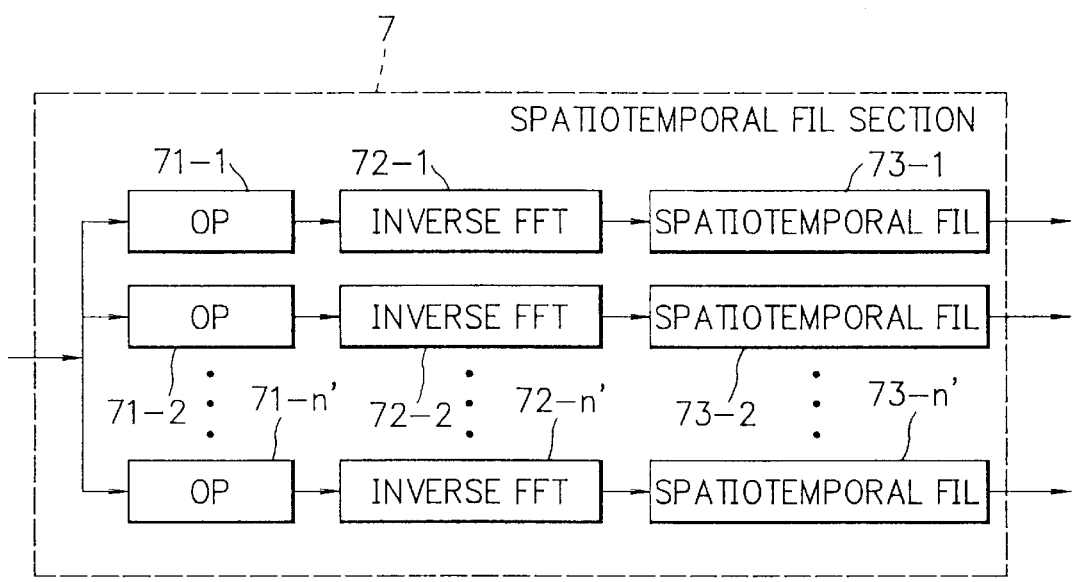
FIG. 5 is a block diagram showing another spatiotemporal filter section of the system of FIG. 1.

FIG. 5 is a block diagram showing the spatiotemporal filter section 7 according to another embodiment of the invention. As shown in FIG. 5, the spatiotemporal filter section 7 is composed of n' operators 71, n' inverse FFT operators 72, and n' temporal filters 73. The operation thereof is similar to that of the spatiotemporal filter section 5. However, the overall procedure is executed individually for each of the parameters k, θ, e.g., a processing by the operator 51-i (i=1 to n') is such that:

$$h(k_x, k_y; \kappa_i, \theta_j, S) = f(k_x, k_y; \kappa_i, \theta_j) g(k_x, k_y; \kappa_i, \theta_j, S).$$

Figure 6:
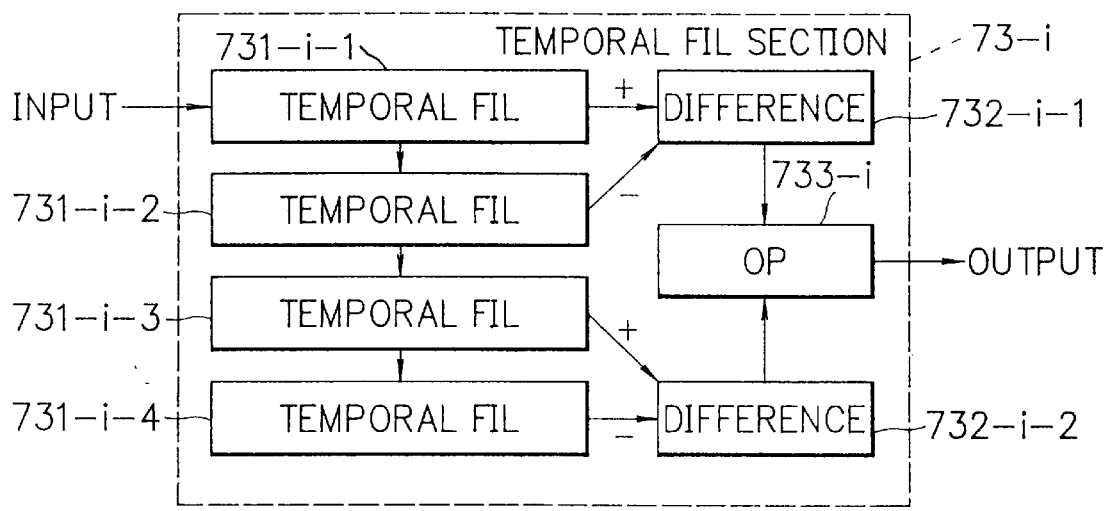
FIG. 6 is a block diagram showing a temporal filter section of the spatiotemporal filter section of FIG. 5.

FIG. 6 is a block diagram showing a temporal filter section 73-i (i=1 to n') of a spatiotemporal filter section according to another embodiment of the invention. As shown in FIG. 6, the temporal filter section 73-i is composed of 4 temporal filters 731-i-j (j=1 to 4), difference calculators 732-i-1, 732-i-2, and an operator 733-i. The operation thereof is similar to that of the temporal filter section 53-i in FIG. 3.

The velocity display section 8 obtains a velocity distribution $\tilde{V}(x,y)$ from the optical flow distribution R(x, y, v, θ) such that:

$$\tilde{V}(x,y) = \{(v_{max}, \theta_{max}); \ddagger(v, \theta) \in C | R(x,y,v_{max}, \theta_{max}) \leq R(x,y,v,\theta)\},$$

where C represents all the values possible for (v, θ).

Figure 7:
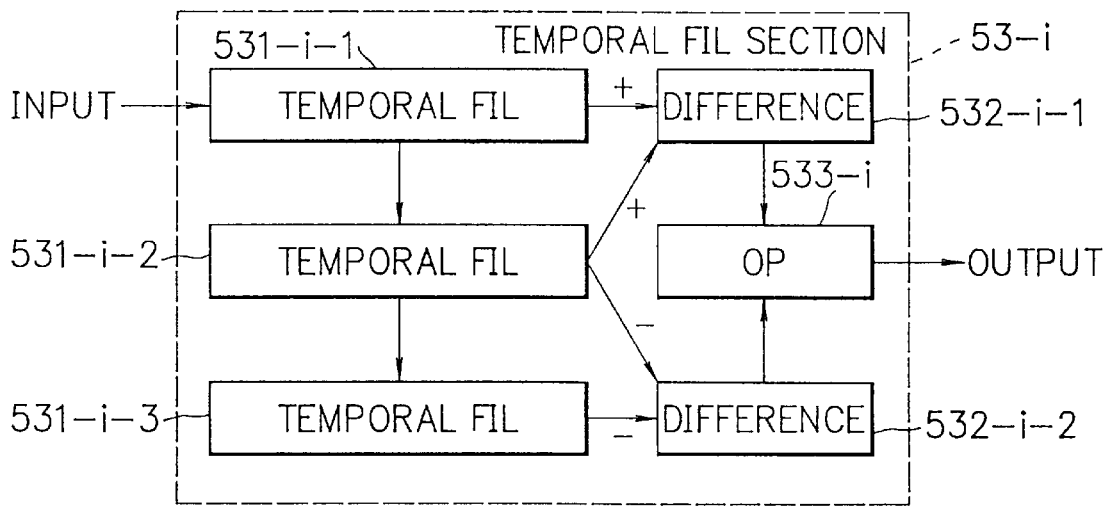
FIG. 7 is a block diagram showing a temporal filter section according to another embodiment of the invention.

FIG. 7 is a block diagram showing a temporal filter section 53-i (i=1 to n) in a spatiotemporal filter section according to another embodiment of the invention. As shown in FIG. 7, the temporal filter section 53-i is composed of 3 temporal filters 531-i-j (j=1 to 3), difference calculators 532-i-1, 532-i-2, and an operator 533-i.

Next, an operation of the embodiment will be described with reference to FIG. 7.

The temporal filter 531-i-j (i=1 to 3) is a reccurrence filter of $n_j$ stages. An output $H_j$ (x, y; •, •, S;t) of a filter j at a time t is calculated according to a picture data $H_{j-1}$(x, y; •, •, S;t) input from a filter j−1 at a time t, and an output $H_j$ (x, y; •, •, S;t−1) of a filter j at a time t−1, such that:

$$\rho_0(x,y;\bullet,\bullet,S;t) = H_j(x,y;\bullet,\bullet,S;t)$$

$$\rho_l(x,y;\bullet,\bullet,S;t) - \rho_l(x,y;\bullet,\bullet,S;t-1) =$$

$$-\omega\{\rho_l(x,y;\bullet,\bullet,S;t-1) - \rho_{l-1}(x,y;\bullet,\bullet,S;t)\},$$

where 1=1−$n_j$, and $$H_j(x, y; \bullet, \bullet S;t) = \rho_{nj}(x, y; \bullet, \bullet, S;t),$$

where $H_0$(x, y; •, •, S;t) represents an input to the temporal filter 53-i. The result therefrom is output to the difference calculator 532-i-1 or 532-i-2 to obtain a difference, which is then output to an operator 533-i for calculating a picture data P(x, y; $\kappa_i$, $\theta_j$, t), such that;

$$P(x,y;\kappa,\theta;t) = [\{H_1(x,y;\kappa,\theta,\sin;t) - H_2(x,y;\kappa,\theta,\sin;t)\} -$$
$$\{H_2(x,y;\kappa,\theta,\cos;t) - H_3(x,y;\kappa,\theta,\cos;t)\}]^2 +$$
$$[\{H_1(x,y;\kappa,\theta,\cos;t) - H_2(x,y;\kappa,\theta,\cos;t)\} +$$
$$\{H_2(x,y;\kappa,\theta,\sin;t) - H_3(x,y;\kappa,\theta,\sin;t)\}]^2,$$

where $H_1$(x, y; κ, θ, sin;t) and $H_2$(x, y;κ, θ, cos;t) are sin and cos outputs of the temporal filter 531-i-1 and 531-i-2, repectively. Compared to the embodiment of FIG. 3, a separation of the local optical flow component in this embodiment becomes somewhat difficult. However, a constitution of the circuit is effectively simplified with an improved cost performance of the system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method for measuring a velocity of a target object, the method comprising the steps of:

measuring spatiotemporal energy of luminance of a motion picture signal representing a target object, as it is obtained from a camera;

determining a local optical flow distribution from a distribution of local spatiotemporal energy obtained by the measurement of the spatiotemporal energy;

determining an optical flow of the target object based on said local optical flow distribution; and determining the velocity of the target object from the optical flow of the target object.

2. A method according to claim 1, wherein said step of measuring spatiotemporal energy of luminance of the motion picture signal comprises:

measuring spatiotemporal energy of luminance of the motion picture signal in a plurality of spatiotemporal filter stages each having a different spatially extended range.

3. A system for measuring a velocity of a target object, the system comprising:

a camera for generating a motion picture signal of a target object;

a first spatiotemporal filter for determining a local spatiotemporal energy of luminance of the motion picture signal;

a convolution operator for determining a local optical flow distribution from a distribution of local spatiotemporal energy obtained by the measurement of the spatiotemporal energy; and a second spatiotemporal filter for calculating an optical flow distribution from the local optical flow distribution.

4. A system for measuring velocity of a targeted object according to claim 3, further comprising:

a velocity display section for calculating a velocity distribution from said optical flow distribution.

5. A method for detecting an optical flow representative of a first motion vector consisting of a first velocity component of a moving object and a second velocity component of the moving object, the method comprising the steps of:

applying an input image of the moving object to a pair of first spatial filters to obtain a pair of first spatially processed images, the first spatial filters each respectively having a first integration kernel thereof localized on a first spatial domain and a first spatial frequency domain, the first integration kernel having a first peak in a positive region of the first spatial frequency domain, the first integration kernel being complex-conjugate to an integration kernel of the other first spatial filter;

applying one of the first spatially processed images to a serial connection of first, second and third temporal attenuation filter stages to have a pair of first temporarily processed images output from the first temporal attennuation filter stage, a pair of second temporarily processed images output from the second temporal attenuation filter stage and a pair of third spatially processed images output from the third temporal attennuation filter stage;

processing the first, second and third temporarily processed images to determine a third velocity component representative of the first velocity component;

applying the other first spatially processed image to a serial connection of fourth, fifth and sixth temporal attenuation filter stages to have a pair of fourth temporarily processed images output from the fourth temporal attenuation filter stage, a pair of fifth temporarily processed images output from the fifth temporal attennuation filter stage and a pair of sixth spatially processed images output from the sixth temporal attennuation filter stage; and processing the fourth, fifth and sixth temporarily processed images to determine a fourth velocity component representative of the second velocity component.

6. A method according to claim 5, wherein the step of processing the first, second and third temporarily processed images comprises the substeps of:

calculating a first difference between one of the first temporarily processed images and one of the second temporarily processed images and a second difference between the other first temporarily processed image and the other second temporarily processed image;

calculating a third difference between said one of the second temporarily processed images and one of the third temporarily processed images and a fourth difference between the other second temporarily processed image and the other third temporarily processed image;

calculating a first sum of the first and fourth differences and a second sum of the second and third differences; and calculating a square sum of the first and second sums.

7. A method according to claim 7, further comprising the steps of:

applying an image composed of a second motion vector consisting of the third velocity component and the fourth velocity component to a pair of second spatial filters to obtain a pair of second spatially processed images, the second spatial filters each respectively having a second integration kernel thereof localized on a second spatial domain and a second spatial frequency domain, the second integration kernel having a second peak different from the first peak in a positive region of the second spatial frequency domain, the second integration kernel being complex-conjugate to an integration kernel of the other second spatial filter;

applying one of the second spatially processed images to a serial connection of seventh, eighth and ninth temporal attenuation filter stages to have a pair of seventh temporarily processed images output from the seventh temporal attenuation filter stage, a pair of eighth temporarily processed images output from the eighth temporal attenuation filter stage and a pair of ninth spatially processed images output from the ninth temporal attenuation filter stage;

processing the seventh, eighth and ninth temporarily processed images to determine a fifth velocity component representative of the first velocity component;

applying the other second spatially processed image to a serial connection of tenth, eleventh and twelfth temporal attenuation filter stages to have a pair of tenth temporarily processed images output from the tenth temporal attenuation filter stage, a pair of eleventh temporarily processed images output from the eleventh temporal attenuation filter stage and a pair of twelfth spatially processed images output from the twelfth temporal attenuation filter stage; and processing the tenth, eleventh and twelfth temporarily processed images to determine a sixth velocity component representative of the second velocity component.

8. A method according to claim 7, wherein the second spatial domain is larger than the first spatial domain.

9. A method according to claim 7, further comprising a step of normaling the second motion vector before the step of applying the second motion vector to the second spatial filters.

10. A method according to claim 7, wherein the step of normaling the second motion vector comprises subjecting the third and fourth velocity components to a threshold and one of a non-linear monotone increasing function and a non-linear upper-limited function.

* * * * *

UNITED STATES PATENT AND TRADEMARK OFFICE
CERTIFICATE OF CORRECTION

PATENT NO. : 5,828,444
DATED : October 27, 1998
INVENTOR(S) : Masahide NOMURA

It is certified that error appears in the above-identified patent and that said Letters Patent is hereby corrected as shown below:

Column 6, line 5, delete "$K_j$" and insert --$K_i$--'

Column 6, line 48, delete "$P_1$" (both occurrences) and insert --$P_e$--;

Column 6, line 50, insert -- = -- before "$\omega$"; delete "$P_1$" and insert --$P_e$--; and delete "$P_{1-1}$" and insert --$P_{e-1}$--; and Column 6, line 53, delete "1" (first occurrence) and insert --$\ell$--.

Column 7, line 40, delete "$\int_{\omega^1}$" and insert --$\int_\omega$--;

Column 7, line 40, delete "$R_{ooo}$" and insert --$R_{-0}$--; and

Column 7, line 46, delete "K'" and insert --$\widetilde{K}'$--.

Column 8, line 25, delete "or for others" and insert --or 0 for others--.

Column 9, line 67 delete "$h(K_x, K_y, K_1, \theta_j)$" and insert -- $h(K_x, K_y, K_l, \theta_j, S)$--.

Column 10, line 22 delete "(i = 1 to 4)" and insert --(j = 1 to 4)--;

Column 10, line 25 delete "(i = 1 to 4)" and insert --(j = 1 to 4)--; and

Column 10, line 42, delete "i-i" and insert --l-1--.

Column 11, line 38, delete "$\ddagger$" and insert --$\forall$--; and

UNITED STATES PATENT AND TRADEMARK OFFICE
CERTIFICATE OF CORRECTION

PATENT NO. : 5,828,444
DATED : October 27, 1998
INVENTOR(S) : Masahide Nomura

It is certified that error appears in the above-identified patent and that said Letters Patent is hereby corrected as shown below:

Column 11, line 48, delete "(i = 1 to 3)" and insert --(j = 1 to 3)--.

Column 12, line 11, delete "repectively" and insert --respectively--.

Column 13, line 50, delete "claim 7" and insert --claim 5--.

Signed and Sealed this

Twentieth Day of July, 1999

Q. TODD DICKINSON

Attest:

Attesting Officer

Acting Commissioner of Patents and Trademarks